(12) United States Patent
Tao et al.

(10) Patent No.: US 11,496,934 B2
(45) Date of Patent: Nov. 8, 2022

(54) CELL (RE-)SELECTION MECHANISMS WITH USING CELL QUALITY DETERMINATIONS

(71) Applicant: Panasonic Intellectual Property Corporation of America, Torrance, CA (US)

(72) Inventors: Ming-Hung Tao, Langen (DE); Hidetoshi Suzuki, Kanagawa (JP); Ankit Bhamri, Langen (DE); Rikin Shah, Langen (DE); Yihui Li, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 16 days.

(21) Appl. No.: 16/932,370

(22) Filed: Jul. 17, 2020

(65) Prior Publication Data

US 2020/0351733 A1  Nov. 5, 2020

Related U.S. Application Data

(63) Continuation of application No. PCT/EP2019/050771, filed on Jan. 14, 2019.

(30) Foreign Application Priority Data

Jan. 19, 2018  (EP) .................................... 18152629

(51) Int. Cl.
*H04W 36/00* (2009.01)
*H04W 76/27* (2018.01)
(Continued)

(52) U.S. Cl.
CPC ...... *H04W 36/0094* (2013.01); *H04B 7/0617* (2013.01); *H04W 36/00837* (2018.08);
(Continued)

(58) Field of Classification Search
CPC ............. H04W 36/0094; H04W 76/27; H04W 36/00837; H04W 36/08; H04W 36/32; H04W 36/00; H04B 7/0617
See application file for complete search history.

(56) References Cited

U.S. PATENT DOCUMENTS

| 2014/0274049 | A1 | 9/2014 | Singh et al. |
| 2019/0268782 | A1* | 8/2019 | Martin .............. H04W 36/0094 |
| 2020/0396627 | A1* | 12/2020 | Hwang ................. H04W 24/08 |

FOREIGN PATENT DOCUMENTS

| EP | 1 587 338 A2 | 10/2005 |
| GB | 2559424 A | 8/2018 |

(Continued)

OTHER PUBLICATIONS

3GPP TR 38.804 V14.0.0, "$3^{rd}$ Generation Partnership Project; Technical Specification Group Radio Access Network; Study on New Radio Access Technology; Radio Interface Protocol Aspects (Release 14)," Mar. 2017, 57 pages.
(Continued)

*Primary Examiner* — Marisol Figueroa
(74) *Attorney, Agent, or Firm* — Seed IP Law Group LLP

(57) ABSTRACT

The present disclosure relates to a mobile terminal for performing cell (re-)selection in a system with at least two suitable cells, each with a plurality of beams. The terminal is in a normal- or a high-mobility state. The terminal measures a signal quality of the beams of each of the suitable cells, determines the cell quality based on the respective measured signal qualities of the beams; and (re-)selects that cell based on a cell (re-)selection criterion using the determined cell qualities. The cell quality is determined for each one of the suitable cells as a sum of the measured signal quality of the beam, with the best signal quality, and a combined beam quality value for the other beams. The combined beam quality value is scaled with a scaling factor which changes depending on the mobility state such that the combined beam quality value is scaled-up in the high-mobility state and scaled-down in the normal-mobility state.

14 Claims, 4 Drawing Sheets

(51) Int. Cl.
*H04B 7/06* (2006.01)
*H04W 36/08* (2009.01)
*H04W 36/32* (2009.01)

(52) U.S. Cl.
CPC .......... *H04W 36/08* (2013.01); *H04W 36/32* (2013.01); *H04W 76/27* (2018.02)

(56) References Cited

FOREIGN PATENT DOCUMENTS

WO   WO-2018084968 A1 *  5/2018   ........... H04B 7/0617
WO   WO-2019137181 A1 *  7/2019   ............ H04W 36/32

OTHER PUBLICATIONS

3GPP TR 38.913 V14.1.0, "3$^{rd}$ Generation Partnership Project; Technical Specification Group Radio Access Network; Study on Scenarios and Requirements for Next Generation Access Technologies; (Release 14)," Dec. 2016, 38 pages.
3GPP TS 36.304 V14.5.0, "3$^{rd}$ Generation Partnership Project; Technical Specification Group Radio Access Network; Evolved Universal Terrestrial Radio Access (E-UTRA); User Equipment (UE) procedures in idle mode (Release 14)," Dec. 2017, 49 pages.
Extended European Search Report, dated May 23, 2018, for European Application No. 18152629.4-1214, 12 pages.
International Search Report, dated Mar. 25, 2019, for International Application No. PCT/EP2019/050771, 2 pages.
Chinese Office Action, dated Nov. 23, 2021, for Chinese Application No. 201980009022.5. (9 pages).

* cited by examiner

CELL (RE-)SELECTION MECHANISMS WITH USING CELL QUALITY DETERMINATIONS

BACKGROUND

Technical Field

The present disclosure relates to a mobile terminal performing cell (re-) selection in a wireless communication system.

Description of the Related Art

Currently, the $3^{rd}$ Generation Partnership Project (3GPP) focuses on the next release (Release 15) of technical specifications for the next generation cellular technology, which is also called fifth generation (5G).

At the 3GPP Technical Specification Group (TSG) Radio Access network (RAN) meeting #71 (Gothenburg, March 2016), the first 5G study item, "*Study on New Radio Access Technology*" involving RAN1, RAN2, RAN3 and RAN4 was approved and is expected to become the Release 15 work item (WI) which will define the first 5G standard.

One objective of 5G new radio (NR) is to provide a single technical framework addressing all usage scenarios, requirements and deployment scenarios defined in 3GPP TSG RAN TR 38.913 v14.1.0, "*Study on Scenarios and Requirements for Next Generation Access Technologies*," December 2016 (available at www.3gpp.org), at least including enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility, anticipating future use cases/deployment scenarios. The backward compatibility to Long Term Evolution (LTE) is not required, which facilitates a completely new system design and/or the introduction of novel features.

As summarized in one of the technical reports for the NR study item (3GPP TSG TR 38.804 v. 14.0.0, "*Study on New Radio Access Technology; Radio Interface Protocol Aspects*," March 2017) the Radio Resource Control sublayer is devised to support three states, namely RRC_IDLE, RRC_INACTIVE and RRC_CONNECTED which together enhance the flexibility of the radio resource control and mobility management. The states can be characterized as follows:

The RRC_IDLE state is characterized by cell (re-)selection mobility. It remains for further study, whether the user equipment's, UE's, Access Stratum, AS, context is not stored in the gNodeB or in the UE. Paging is initiated by the Core Network, CN; and a paging area is managed by the CN.

The RRC_INACTIVE state is also characterized by cell (re-)selection mobility. Between the CN and a NR Random Access Network, NR RAN, interface a connection has been established for the UE, namely for both C/U-planes. The UE's AS context is stored in at least one gNodeB and the UE. Paging is initiated by the NR RAN interface, and a RAN-based notification area is managed by the NR RAN interface. The NR RAN interface knows the RAN-based notification area which the UE belongs to.

The RRC_CONNECTED state is characterized by a UE having a NR Radio Resource Control, RRC, connection. Also, the UE has an AS context in the NR. The NR RAN interface knows the cell which the UE belongs to, and the transfer of uncast data to/from the UE is supported. Further, mobility is network controlled, e.g., the UE is handed between cells within NR and to/from E-UTRAN.

Cell Selection

Cell selection is performed by one of the following two procedures:

a) Initial cell selection (no prior knowledge of which RF channels are NR carriers);
  1. The UE scans all RF channels in the NR bands according to its capabilities to find a suitable cell.
  2. On each carrier frequency, the UE need only search for the strongest cell.
  3. Once a suitable cell is found this cell shall be selected.
b) Cell selection by leveraging stored information.
  1. This procedure requires stored information of carrier frequencies and optionally also information on cell parameters, from previously received measurement control information elements or from previously detected cells.
  2. Once the UE has found a suitable cell the UE shall select it.
  3. If no suitable cell is found the Initial Cell Selection procedure shall be started.

The following three levels of services are provided while a UE is in RRC_IDLE:

Limited service (emergency calls, ETWS and CMAS on an acceptable cell);
Normal service (for public use on a suitable cell);
Operator service (for operators only on a reserved cell).

The definition of an acceptable cell, a suitable cell, a barred cell and a reserved cell is also applicable for cell selection in NR. A cell is considered as suitable if the following conditions are fulfilled:

Measurement quality of a cell is above a threshold;
A cell is served by the selected/registered PLMN and not barred.

In multi-beam operations, measurement quantity of a cell is derived amongst the beams corresponding to the same cell. It remains for further study how to derive the cell level measurement quantity from multiple beams, which may or needs not be different for the one in RRC_CONNECTED.

Cell Reselection

The following cell reselection mechanisms are applicable based on the corresponding parameters broadcast while the UE is camping on a cell in NR:

Intra-frequency reselection is based on ranking of cells.
Inter-frequency reselection is based on absolute priorities.
Inter-RAT reselection can be also based on absolute priorities.
Frequency specific cell reselection parameters common to all neighboring cells on a frequency;
Service specific prioritization;

For NR, it remains for further study for which services the service specific prioritization is applied and how it could be applied for the case of network slices.

A concept of neighbor cell lists and black cell lists;
Speed dependent cell reselection.

In multi-beam operations, measurement quantity of a cell is derived from N best beams corresponding to the same cell where the value of N can be configured to 1 or more than 1.

It also remains for further study on details of filtering to be applied (e.g., for the case N=1, the best beam is filtered by a single filter as the best beam changes) and whether to only consider beams above a threshold (good beams).

Network Controlled Mobility

Network controlled mobility is applied for the UE in RRC_CONNECTED and is dealt with or without RRC. The RRC driven mobility is responsible for the cell level mobility, e.g., handover. Handover signaling procedures adopt the same principle as Rel-13 LTE. For inter-gNB handover, the signaling procedures consist of at least the following elemental components.

1. The source gNB initiates handover and issues a Handover Request over the Xn interface.

2. The target gNB performs admission control and provides the RRC configuration as part of the Handover Acknowledgement.

3. The source gNB provides the RRC configuration to the UE in the Handover Command. The Handover Command message includes at least cell ID and all information required to access the target cell so that the UE can access the target cell without reading system information. For some cases, the information required for contention based and contention free random access can be included in the Handover Command message. The access information to the target cell may include beam specific information, if any.

4. The UE moves the RRC connection to the target gNB and replies the Handover Complete.

The handover mechanism driven by RRC requires the UE at least to reset the MAC entity if multi-connectivity is not configured for the UE. The handover with and without re-establishing the PDCP entity is supported, which is to be confirmed by SA3 whether handover without security key change is acceptable. In-sequence and lossless delivery without duplicates (from upper layer viewpoint) is supported for handover within NR.

It remains for further study whether QoS flow can be remapped at handover and, if supported, whether the handover is lossless in this case.

For mobility without RRC, it is dealt with PHY and/or MAC on the beam or TRxP level. As such, intra-cell mobility can be handled by mobility without RRC. One gNB corresponds to one or many TRxPs.

It also remains for further study whether there may be cases for which intra-cell mobility needs to be handled by RRC.

BRIEF SUMMARY

One non-limiting and exemplary embodiment facilitates the mobile terminal to perform cell (re-) selection in a system with at least two suitable cells, each with plural beams, in a robust (reliable) manner, namely by utilizing the mobile terminal's mobility state, for changing the effect measurements from plural beams have on the determination of each of the cell qualities.

In an embodiment, the techniques disclosed here feature, a mobile terminal is suggested for performing cell (re-) selection in a wireless communication system. The system comprises at least two suitable cells for the mobile terminal to camp on. Each cell is configured with a plurality of beams. Further, the mobile terminal is configured in one of at least a normal- or a high-mobility state. The mobile terminal comprises circuitry which in operation: measures a signal quality of the plurality of beams of each of the at least two suitable cells; determines the cell quality for each of the at least two suitable cells based on the respective measured signal qualities of the plurality of beams; and (re-)selects that cell from the at least two suitable cells for camping thereon based on a cell (re-) selection criterion using the determined cell qualities. The cell quality is determined for each one of the at least two suitable cells as a sum of the measured signal quality of the beam, with the best signal quality, and a combined beam quality value for the other of the plurality of beams, and the combined beam quality value is scaled with a scaling factor which changes depending on the mobility state such that the combined beam quality value is scaled-up in the high-mobility state and scaled-down in the normal-mobility state.

In another general aspect, the techniques disclosed here feature, another mobile terminal is proposed for performing cell (re-)selection in a wireless communication system. The system comprises at least two suitable cells for the mobile terminal to camp on. Each of the cells is configured with a plurality of beams. Further, the mobile terminal is configured in one of at least a normal- or a high-mobility state. The mobile terminal comprises circuitry which in operation: measures a signal quality of the plurality of beams of each of the at least two suitable cells; determines the cell quality for each of the at least two suitable cells based on the respective measured signal quality of the plurality of beams; and (re-)selects that cell from the at least two suitable cells for camping thereon based on a cell (re-)selection criterion using the determined cell qualities. The cell quality is determined for each one of the at least two suitable cells as a combined beam quality value for a maximum number of beams, with the best signal qualities, out of the plurality of beams, and the maximum number of beams for the combined beam quality value changes depending on the mobility state such that the maximum number is larger in the high-mobility state and the maximum number is smaller in the normal-mobility state.

In further general aspect, the techniques disclosed here feature, a method for a method is proposed for a mobile terminal to perform cell (re-)selection in a wireless communication system. The system comprises at least two suitable cells for the mobile terminal to camp on. Each of the cells is configured with a plurality of beams. Further, the mobile terminal is configured in one of at least a normal- or a high-mobility state. The method comprising the following steps performed by the mobile terminal: measuring a signal quality of the plurality of beams of each of the at least two suitable cells; determining the cell quality for each of the at least two suitable cells based on the respective measured signal qualities of the plurality of beams; and (re-)selecting that cell from the at least two suitable cells for camping thereon based on a cell (re-)selection criterion using the determined cell qualities. The cell quality is determined for each one of the at least two suitable cells as a sum of the measured signal quality of the beam, with the best signal quality, and a combined beam quality value for the other of the plurality of beams, and the combined beam quality value is scaled with a scaling factor which changes depending on the mobility state such that the combined beam quality value is scaled-up in the high-mobility state and scaled-down in the normal-mobility state.

In yet another general aspect, the techniques disclosed here feature, another method is suggested for a mobile terminal to perform cell (re-)selection in a wireless communication system. The system comprises at least two suitable cells for the mobile terminal to camp on. Each cell is configured with a plurality of beams. Further, the mobile terminal is configured in one of at least a normal- or a high-mobility state. The method comprises the following steps performed by the mobile terminal: measuring a signal quality of the plurality of beams of each of the at least two suitable cells; determining the cell quality for each of the at least two suitable cells based on the respective measured signal qualities of the plurality of beams; and (re-)selecting that cell from the at least two suitable cells for camping thereon based on a cell (re-)selection criterion using the determined cell qualities. The cell quality is determined for each one of the at least two suitable cells as a combined beam quality value for a maximum number of beams, with the best signal qualities, out of the plurality of beams, and the maximum number of beams for the combined beam quality value changes depending on the mobility state such that the maximum number is larger in the high-mobility state and the maximum number is smaller in the normal-mobility state.

It should be noted that general or specific embodiments may be implemented as a system, a method, an integrated circuit, a computer program, a storage medium, or any selective combination thereof.

Additional benefits and advantages of the disclosed embodiments will be apparent from the specification and Figures. The benefits and/or advantages may be individually obtained by the various embodiments and features of the specification and drawings, which need not all be provided in order to obtain one or more of such benefits and/or advantages.

DETAILED DESCRIPTION

As identified in TR 38.913, the various use cases/deployment scenarios for NR have diverse requirements in terms of data rates, latency, and coverage. With these requirements in mind NR should aim for even higher coverage, as compared with LTE.

In 3GPP RAN1 #85, beam based transmissions, namely between a Transmission Reception Point, TRxP, of a gNodeB and a UE, have been discussed extensively for NR as a technology to ensure coverage. For beam management both intra-TRxP and inter-TRxP beamforming procedures are considered, and beamforming procedures are considered with/without TRxP beamforming/beam sweeping and with/without UE beamforming/beam sweeping, according to the following potential use cases: UE movement, UE rotation, beam blocking (change of beam at TRxP, same beam at UE; same beam at TRxP, change of beam at UE; or change of beam at TRxP, change of beam at UE) where other cases are not precluded. It was further agreed to study beam (e.g., TRxP beam(s) and/or UE beam(s)) management procedure (e.g., beam determination and change procedure) with/without prior acquired beam(s) information, namely for both data and control transmission/receptions, where the procedures may or may not be the same for data and control.

In RRC_CONNECTED, the UE measures multiple beams (at least one) of a cell and the measurements results (power values) are averaged to derive the cell quality. In doing so, the UE is configured to consider a subset of the detected beams: the N best beams above an absolute threshold. Filtering takes place at two different levels: at the physical layer to derive beam quality and then at RRC level to derive cell quality from multiple beams. Cell quality from beam measurements is derived in the same way for the serving cell(s) and for the non-serving cell(s). Measurement reports may contain the measurement results of the X best beams if the UE is configured to do so by the gNodeB.

However, as of today no agreement is reached for cell (re-)selection mobility in RRC_IDLE or RRC_INACTIVE.

Different from network controlled mobility in RRC_CONNECTED, in RRC_IDLE or RRC_INACTIVE mobility is ensured via cell (re-)selection mechanisms which are absent of control form the network. Accordingly, the above recited agreements cannot be applied thereto. Also, well established cell (re-)selection mechanisms from E-UTRAN do not work in a 3GPP NR deployment scenario. The use of such mechanisms is generally prohibited due to the inherent incompatibilities with multi-beam operations introduced in 3GPP NR.

Consequently, non-limiting and exemplary embodiment facilitates the mobile terminal to perform cell (re-)selection in a system with at least two suitable cells, each with plural beams, in a robust (reliable) manner, namely by utilizing the mobile terminal's mobility state for changing the effect measurements from one or more of plural beams have on the determination of each of the cell qualities.

Figure 3:
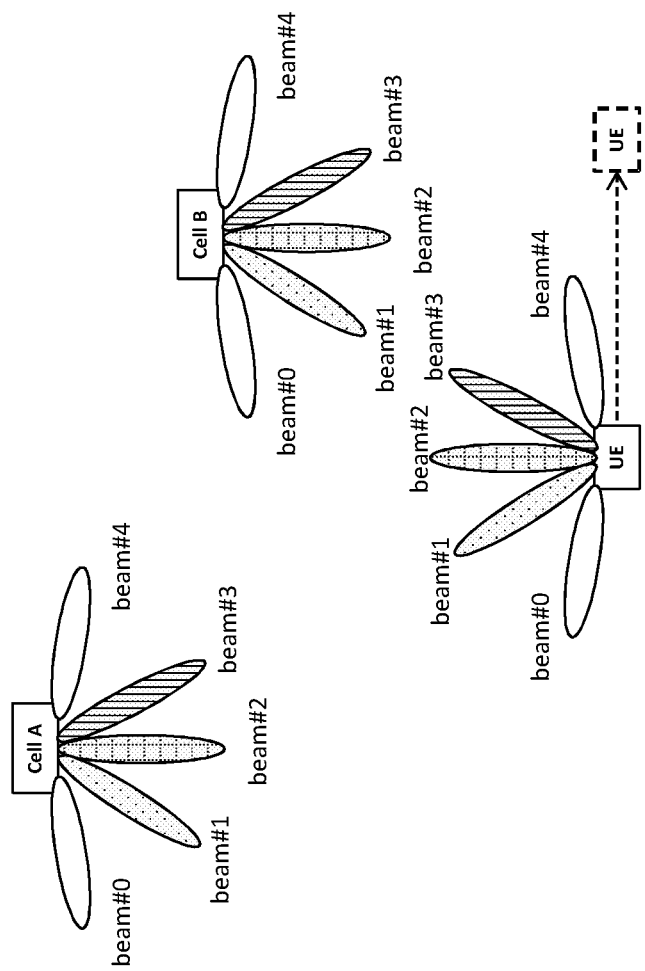
FIG. 3 is schematic drawings illustrating an exemplary situation for performing a cell (re-) selection mechanism in the context of a 3GPP NR deployment scenario.
Figure 4:
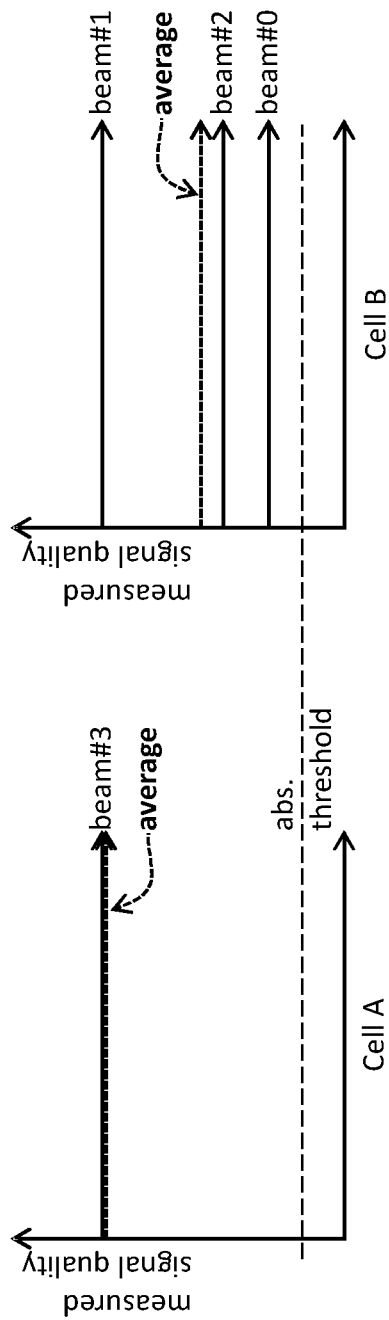
FIG. 4 is schematic drawings illustrating measurements for the exemplary situation of performing the cell (re-) selection mechanism of FIG. 3 in a 3GPP NR deployment scenario.

The suggested robust mechanism can better be understood when turning to the specific example shown in FIGS. 3 and 4. This understanding is generally based on, however not restricted to, a deployment scenario of 3GPP NR, namely where the concept of beams is introduced to improve directivity and/or coverage. This is particularly advantageous in view of the envisioned very high frequency bands (millimeter wave) in which 3GPP NR is intended to operate.

As shown in FIG. 3, a gNB can be configured with a cell (e.g., Cell A or Cell B) to communicate on multiple beams (e.g., beam #0 to beam #4). This is necessary for the initial access by the UE. After having established a connection between the gNB and the UE, the gNB serves the UE with a downlink on a single beam (termed "downlink serving beam" or "downlink beam"). Having said this, it shall be appreciated that multiple-beam scenarios can also be envisioned, namely where the gNB serves the UE with a downlink via two or more separate beams, for instance to increase capacity.

Similarly, the UE can be configured to communicate on multiple beams (e.g., beam #0 to beam #4). This is equally necessary for the initial access by the UE. After having established the connection, the UE is sending uplink traffic to the gNB with an uplink also on a single beam (termed "uplink serving beam" or "uplink beam"). This single uplink serving beam is, however, not necessarily the same as the beam on which the downlink is served. Also in the uplink, multiple-beam scenarios can be envisioned such that the disclosure shall not be construed as being limited in any respect.

In general, the pair(s) of downlink and uplink serving beams has (have) suitable properties (e.g., acceptable signal quality) for the downlink and uplink communication between the gNB and the UE. In many cases, it can be readily understood that there is a correspondence in directivity between the pair(s) of downlink serving beam and uplink serving beam, namely that the pair of downlink and uplink serving beams are beams having opposite directions and similar coverage.

In this context, it shall be mentioned that a gNB in 3GPP NR is configured with a cell with one or multiple TRxP (Transmit/Receive Points or Tx/Rx Points), each TRxP being linked to one or multiple downlink and/or uplink serving beams with a specific direction and a specific coverage. For a multi-beam configuration, the gNB may be configured with more than one TRxP, namely to be capable of transmitting/receiving beams with different directions and/or coverage.

Coming back to the specific example, due to the restricted directivity and coverage of the beams, a UE in a steady location will (unless exceptional propagation conditions occur) only receive downlink communication from a single downlink beam of a gNB, and not via the plurality of downlink beams within a cell configured in the gNB (e.g., beam #0 to beam #4). Similarly, the gNB receives the uplink communication from a single uplink beam of the UE with opposite directions and similar coverage. Accordingly, individual pairs of downlink and uplink serving beams (e.g., beam #3 of Cell A and beam #1 of Cell B) contribute to an acceptable signal quality for the downlink and uplink communication between the gNB and the UE.

However, this changes when considering the effect of UE mobility.

Once, the UE changes its location (indicated in dashed lines in FIG. 3), this movement reduces the contribution of individual pairs of downlink and uplink serving beams to an acceptable signal quality for the downlink and uplink communication between gNB and the UE. Rather, a seamless transition between multiple downlink and uplink serving beams (beam #1 to beam #3 of Cell A and beam #1 to beam #2 of Cell B) with complementing directivity and coverage achieves the acceptable quality for the downlink and uplink communication between gNB and the UE.

Accordingly, depending on the UE's mobility (also referred to as UE mobility state), the contribution of individual pairs of downlink and uplink serving beams changes to the degree that an acceptable signal quality for uplink and downlink communication between gNB and UE can only be achieved through multiple downlink and uplink serving beams with complementing coverage and directivity.

Coming now to cell selection or cell reselection mechanisms.

It is readily understood, that a UE carries out cell selection or cell reselection autonomously in order to identify a cell for it to camp on. Camping refers to a connection type where the core network can only communicate with the UE in one direction, namely in form of downlink communication. This form of downlink communication with the UE is also referred to as paging initiated by the core network.

From the network perspective, a UE can camp on different types of cells, namely an acceptable cell, a suitable cell, a barred cell or a reserved cell. Depending on the type of cell, the UE is provided with different levels of services. For example, an acceptable cell is defined to provide limited services, such as emergency calls, earthquake and tsunami warning system, ETWS, services, or commercial mobile alert system, CMAS, services. The limited service of an acceptable cell is a baseline to the functionality a network is striving to achieve.

Different from the acceptable cell, a suitable cell provides the normal service to a UE. In other words, when a UE is camping on a suitable cell, this UE is served by a public land mobile network, PLMN to be provided with normal services. For the sake of simplicity, the following description is limited to only suitable cells and thus considers only cell selection of or cell reselection between suitable cells.

Further, a downlink communication in form of paging does not directly compare with the downlink and uplink communication between the gNB and the UE described before. Different from the communication via serving beam pairs, e.g., pairs of downlink and uplink serving beams, the paging is not bound by specific serving beams of a gNB.

Instead, the downlink communication in form of paging is effected via the plurality of downlink beams (not specific downlink serving beam(s)) of all suitable cells in specific paging area. In summary, the paging provides for a downlink communication which does not control or manage the communication path, however, at the expense of blocking an increasing amount of communication resources.

Also the paging downlink communication is effected via the (same) downlink beams of the cells shown in FIG. 3, with the specialty that it is affected via all beams of the (plural) cells. In other words, the paging initiated by the core network will result in the downlink communication to the UE being transmitted via all the beams of the cells (e.g., beam #0 to beam #4 of Cell A and Cell B) where only directivity and coverage of the beam determine whether or not the paging is received in acceptable quality.

Due to the restricted directivity and coverage of beams, the UE will however, not receive paging from all beams of the (plural) cells. Rather, the UE has to select or reselect onto one of the (plural) cells, namely that cell which is for a given mobility state of a UE the strongest cell from among the plural cells (e.g., suitable cells). Having selected the strongest cell, the UE will camp on that cell as long as there is no significant change to the measured cell qualities.

The decision to select or reselect onto a cell is carried out based on measured signal qualities. Particularly, the UE bases this decision on measurements of the signal quality of each of the beams where, for instance, its received signal strength is above the absolute threshold. Exemplarily, the signal quality can be measured on reference signals which a gNB transmits on network-configured resources on each of the plurality of beams.

Again, due to the restricted directivity and coverage of beams, the measured signal qualities of the beams of the cell substantially depend on the location of the UE. For example, in FIG. 3, the UE is expected to measure the best signal quality on beam #3 of Cell A and on beam #1 of Cell B. Accordingly, the beam #3 of cell A and the beam #1 of cell B are the best beams which have the highest measured signal quality.

Further, due to the restricted coverage of the beams, the UE measures a signal quality for beam #0 to beam #2 of Cell A as well as beam #4 of Cell A which is below an absolute threshold. Similarly, due to the restricted directivity of the beams, the UE measures a signal quality for beam #0 and beam #2 of Cell B is smaller than the signal quality of the best beam (e.g., beam #1 of cell B), and for beam #3 and beam #4 a signal quality below the absolute threshold.

For sake of simplicity, signal quality measurements of beams below an absolute threshold are excluded from further consideration. For example, such an absolute threshold can be defined with regard to the cell's received synchronization signal quality $\hat{E}_s/I_{ot}$ (defined as the energy per Resource Element (RE) of the synchronization signals divided by the total received energy of noise and interference on the same RE), namely such that the signal quality is at least −6 dB or at least −4 dB.

These signal quality measurements are depicted in FIG. 4. In other words, FIG. 4 shows measurements for the exemplary situation of performing the cell (re-)selection mechanism of FIG. 3.

On this basis, it is immediately apparent that determination of an (appropriate) cell quality requires further considerations for it to allow that the cell selection or cell reselection is carried out in a robust (reliable) manner. Particularly, when determining the cell quality with all measured beam qualities this can result in an inappropriate cell (re-)selection as can be seen below.

For the sake of argument, the example shown in FIG. 4 details for each of the Cell A and Cell B an (arithmetic) average of the measured signal qualities of each of all beams of the cells provided the measurements are above an absolute threshold. For the Cell A, the measured signal quality of only a single beam, namely beam #3 is considered in the (arithmetic) average. For the Cell B, the measured signal qualities of three beams, namely beam #0 to beam #2 are considered in the (arithmetic) average.

Assuming now that the (arithmetic) average of each of Cell A and Cell B are determined as respective cell qualities, then a cell (re-)selection on the basis of these cell qualities will result in the selection of the Cell A (not Cell B). This, however, cannot be considered a robust (reliable) cell (re-)selection. Rather, only Cell B could ensure a seamless transition between multiple beams with complementing coverage and directivity, particularly in case the UE is highly mobile, e.g., the UE is in a high-mobility state.

Hence, there is need for a robust (reliable) cell (re-)selection mechanism which determines a cell quality based on signal quality measurements of all the beam of a cell, which, at the same time, does not penalize cells with a high number of beams over cells with only one or a low number of beams. Only when penalties for cells with high number of beams are avoided, an accordingly determined cell quality can ensure that a robust (reliable) cell (re-)selection is carried out.

The present disclosure provides a robust (reliable) cell (re-)selection mechanism by changing the effect signal quality measurement from plural beam have on the determination of the cell quality. These changes are depending on the mobility state of the UE. In other words, the present disclosure prescribes a determination of a cell quality which does not only consider the measured beam quality but also changes their effect on the cell quality utilizing the UEs mobility state.

These mechanisms are particularly suitable for a proposed scenario in 3GPP NR according to which the cell selection or cell reselection results in the UE camping onto cell where each of the plurality of beams equally carries the downlink communication in form of paging to an UE and thus allows the reception thereof over plural beams with complementing directivity and coverage, for example in a high mobility state.

Generally, the present disclosure provides devices and methods for cell selection or cell reselection in a wireless communication system with at least two suitable cells where the cell quality value is determined based on a combined beam quality value which reflects the measured signal qualities of one or more of plural beams and which changes depending on the mobility state. As the mobility state may change over time, the combined beam quality value is varied so that it can better match a situation (e.g., high-mobility state) where it is advantageous, for the combine beam quality value, to reflect the measured signal qualities from all of the beams of the cells or another situation (e.g., normal-mobility state) where it is advantageous, for the combined beam quality value, to reflect the measured signal quality from only the best quality beam(s) of the cells.

For this purpose, it is proposed in a first embodiment that the combined beam quality value (itself) is the sum of the measured beam quality of the best beam and the combined beam quality value of other beams excluding the best quality beam. The combined beam quality value of other beams excluding the best quality beam scaled with a scaling factor which changes depending on the mobility state, such that the combined beam quality value of other beam excluding the best beam is scaled-up in the high-mobility state and that the combined beam quality value of other beam excluding the best beam is scaled-down in the low-mobility state. Accordingly, depending on the mobility state, the effect, which the measured signal qualities of all the beams of a cell have, is changed when determining the cell quality as part of the cell selection or cell reselection of a cell.

Also, it is proposed in a second embodiment that the maximum number of beams considered in the combined beam quality value of all beams including the beast quality beam is changed depending on the mobility state, such that the maximum number of beams is larger in the high-mobility state and that the maximum number of beams is smaller in the low mobility state. Accordingly, depending on the mobility state, the effect, which the measured signal qualities of all the beams of a cell have, is again changed when determining the cell quality as part of the cell selection or reselection of a cell.

Figure 1:
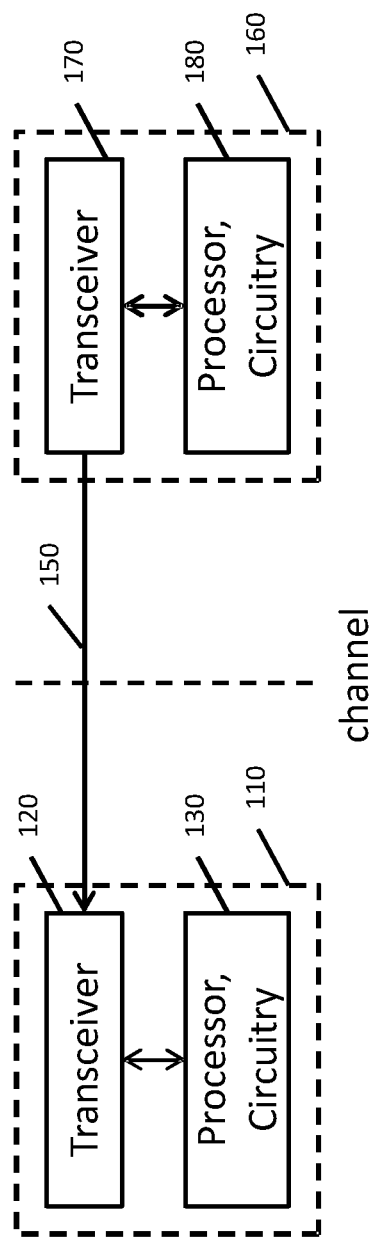
FIG. 1 is a block diagram showing the structure of a mobile terminal and a base station.

FIG. 1 illustrates a block diagram of the wireless communication system including a mobile terminal 110 and one, preferably at least two base stations 160, each being configure with a suitable cell having a plurality of beams for downlink communication 150. The mobile terminal 110 is configured in at least one of a normal-mobility state or a high-mobility state, preferably in one of a normal-, high-, or an (intermediate) medium-mobility state. In other words, the downlink communication 150 between the mobile terminal 110 and the base station 160 is taking place on one possibly more (e.g., rapidly changing) beams, depending on the mobility state of the mobile terminal 110.

In the context of the present disclosure, the term beam is to be construed as having a specific (pre-determined) directivity and/or coverage. Each of the beams has a different directivity and/or coverage, thereby resulting in ability for the transmitter to transmit signal to a receiver at different (spatial) positions. In other words, each of the beams has different spatial parameters (e.g., gain and/or beam width).

The mobile terminal 110 comprises a transceiver 120 which, in operation, measures a signal quality of the plurality of beams of each of the at least two suitable cells. Further, the mobile terminal 110 comprises a processor 130 which, in operation, determines the cell quality for each of the at least two suitable cells based on the respective measured signal qualities of the plurality of beams; and, configures the transceiver 120 (re-) select that cell from the at least two suitable cells for camping thereon based on a cell (re-) selection criterion using the determined cell qualities.

According to the first embodiment, the processor 130, in operation, is adapted to determine the cell quality for each one of the at least two suitable cells as a sum of the measured signal quality of the beam, with the best signal quality, and a combined beam quality value for the other of the plurality of beams, wherein the combined beam quality value is scaled with a scaling factor which changes depending on the mobility state such that the combined beam quality value is scaled-up in the high-mobility state and scaled-down in the normal-mobility state.

According to the second embodiment, the processor 130, in operation, is adapted to determine the cell quality for each one of the at least two suitable cells as a combined beam quality value for a maximum number of beams, with the best signal qualities, out of the plurality of beams, wherein the maximum number of beams for the combined beam quality value changes depending on the mobility state such that the maximum number is larger in the high-mobility state and the maximum number is smaller in the normal-mobility state.

The one, preferably at least two base stations 160 are each configured with a suitable cell having a plurality beams, and comprising a transceiver 170 and a processor 180 which, in operation, transmits to the mobile terminal 110 signals on the plurality of beams, for the mobile terminal 110 to perform cell selection or cell reselection onto one of the cells.

Figure 2:
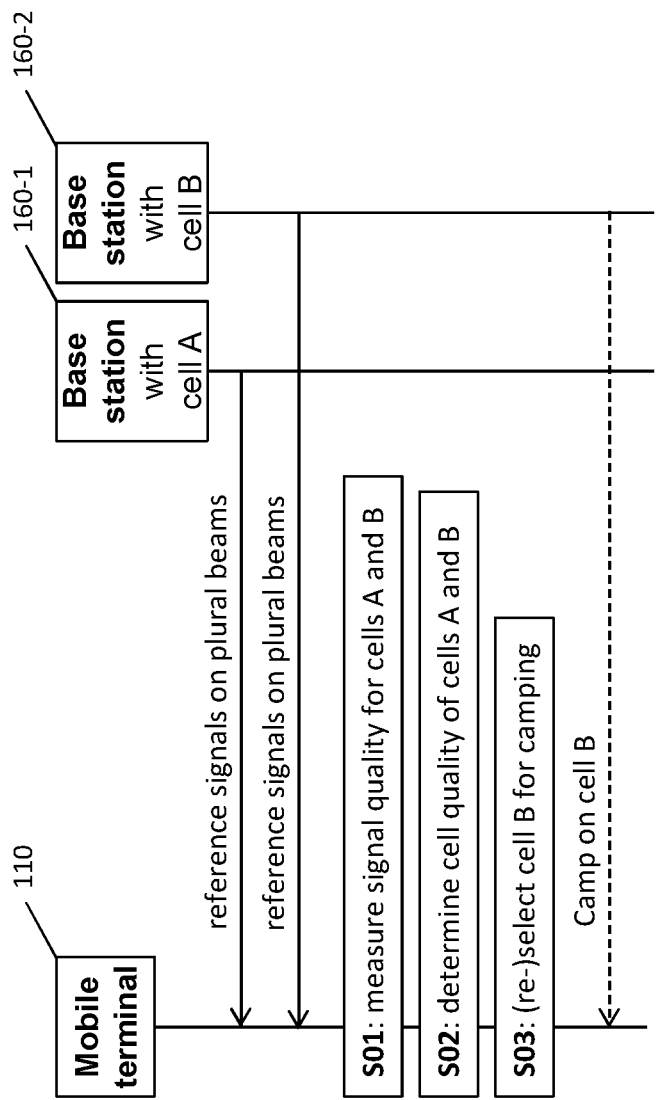
FIG. 2 is schematic drawings illustrating a cell (re-) selection mechanism in the context of a 3GPP NR deployment scenario.

FIG. 2 illustrates in form of a schematic drawing an exemplary situation for performing a cell (re-) selection mechanism in the context of a 3GPP NR deployment scenario. Notably, this figure contains same reference numbers with other figures for same elements, where, for conciseness reasons, a repetitive description has been omitted.

Again the mobile terminal 110 (also referred to as UE) is shown which performs cell selection or cell reselection in a wireless communication system. The wireless communication system comprises at least the two base stations 160-1, 160-2, each configured with suitable cell (e.g., cell A and cell B) for the mobile terminal 110 to camp on. Each of the at least two suitable cells (e.g., cell A and cell B) has a plurality of beams. From either one of the suitable cells, the mobile terminal 110 can receive its normal service as discussed before.

In implementations, discussed in the context of 3GPP NR deployment scenarios, a cell can be configured with between four (4) and thirty-two (32) beams. This, however, heavily depends on the types of antennas used in the base station which is configured with the cell. For example with medium or large sized antenna arrays it is possible to achieve the restricted directivity and coverage which multi-beam communication is designed for.

The mobile terminal 110 is also configured in a mobility state. The mobility state has to be understood as specifying whether the mobile terminal is moving or kept in a steady location. In one example, the mobility state is defined as one of a high-mobility state (e.g., where the mobile terminal is moving), and a normal mobility state (e.g., where the mobile terminal is kept in a stead location). The mobility state can, in another example, also be defined as one of a high-mobility state, a medium-mobility state and a normal-mobility state. Then, the high- and medium-mobility states further distinguish between different rates of movement, e.g., whether the mobile terminal is moving frequently or occasionally changing its location.

In the context of the present disclosure, it is assumed that the mobile terminal 110 can detect its own mobility state and, then, can be configured accordingly. For the detection of the mobility state, one exemplary implementation of the mobile terminal 110 considers the number of attempted or completed cell reselections in a specific (pre-defined) time period. If the number of attempted or completed cell reselections per time period is high, then the mobile terminal 110 is in a high-mobility state, if this number is low, then the mobile terminal 110 is in a normal-mobility state.

In the context of the 3GPP NR deployment scenario, it is assumed that the mobile terminal 110 is in either the RRC_IDLE state or in the RRC_INACTIVE state while performing the cell selection or reselection, but not in the RRC_CONNECTED state. For this reason, the mobile terminal 110 is receiving downlink communication, e.g., in form of paging from the network, but does not actively controlled by the network. Due to mobility reasons, the mobile terminal 110 performs, when necessary, a cell selection or cell reselection mechanism.

It is evident from the above description of the related art that both, the cell selection and cell reselection mechanisms are targeted different use-cases. For instance, the cell selection mechanism is for mobile terminals which are turned initially on, whereas the cell reselection mechanism is for mobile terminals which are camping on a cell with inferior signal quality. Accordingly, both mechanisms have different viewing angles on the criteria specifying under what conditions and when (or if at all) a cell is to be selected or reselected. This is, however, not the focus of the present disclosure.

Rather, the present disclosure is concerned with an improved cell quality determination only. Importantly, this improved cell quality determination is to be employed in both mechanism and results for all different use-cases in same or similar improvements. Accordingly, the present disclosure considers both, the cell selection and cell reselection synonymously, however only for the valuation of the advantages resulting from the improved cell quality determination.

It can easily be understood that for both, the cell selection and the cell reselection, the (improved) determination of the cell quality is an important, more specifically, the most important aspect. Without the determination of cell qualities, it would not be possible to compare different cells in order to determine which one of plural cells is the best cell candidate (with the best cell quality) for the cell selection or cell reselection to be performed onto. Accordingly, for both, the cell selection and cell reselection, it is equally necessary to determine a cell quality.

In the wireless communication system, the base stations 160-1 and 160-2 (repeatedly) transmit signals for the each of the cells (e.g., Cell A and Cell B) on all its beams. These signals permit signal quality measurements which are necessary for the mobile terminal 110 to carry out the cell selection or cell reselection mechanism. In other words, the transmission of (reference) signals is a pre-requisite for and thus inherent to the mechanism of performing cell selection or cell reselection.

In the context of the 3GPP NR deployment scenario, the signals transmitted on all of the beams of each of the cells (e.g., Cell A and Cell B) are synchronization signals, e.g., signals which are known to both the base station 160-1, 106-2 and the mobile station 110. Based on the measurements on the synchronization signal, the mobile terminal is capable of inferring a receive power.

Notably, in the 3GPP NR deployment scenario the base stations transmit plural types of reference signals which are uses for different purposes. In present disclosure, reference is made to the synchronization signal block carrying information which permits a unique identification of one beam from the plural beams. In this respect, despite belonging to a specific cell, the mobile station can distinguish between reference signals from different beams.

In step S01 of FIG. 2, the mobile terminal 110 measures the signal quality of the plurality beams of each of the at least two suitable cells. For these measurements, it is inherent that the signals must be received first. Then, the signal quality measurements can be performed. These measurements result in value corresponding to the signal quality of the beam.

Notably, the measured signal quality permits a comparison or a ranking of all the beams. In other words, based on this signal quality the mobile terminal can identify which one from the plurality beams of a cell is the best beam (or beam with the best signal quality), which one is the second best beam (or beam with the second to best signal quality) and so forth. Consequently, the signal quality defines a relation between all of the plurality of beams of a cell.

In the context of the 3GPP NR deployment scenario, the mobile terminal 110 measures for all beams the Reference Signal Receive Power (RSRP) which is a type of signal strength measurement indicative of the beam coverage. Particularly, RSRP is defined as the linear average over the power contributions (in Watts) of the resource elements, REs, that carry the reference signals for the respective beam within the considered measurement frequency bandwidth.

Alternatively, in the 3GPP NR deployment scenario the mobile terminal 110 measures for all beams the Reference Signal Received Quality (RSRQ), which is defined as the ratio of RSRP to RSSI (where RSSI corresponds to the total received power including interference from all sources). With either one of the measured RSRP or RSRQ, the mobile station 110 can compare the signal qualities of the all the beams of the cells.

In step S02 of FIG. 2, the mobile terminal 110 determines a cell quality of each of the cells (e.g., cell A and cell B). The cell quality is determined based on the measured signal qualities of the respective one of the cells. In particular, for cell A the cell quality is determined based on all the measured signal qualities of the beams of cell A, whereas for cell B, the cell quality is determined based on all the measured signal qualities of the beams of cell B.

Again, with regard to FIGS. 3 and 4, it has been already set out that it is disadvantageous to determine the cell quality as an (arithmetic) average of the measured signal quality of all beams (e.g., above an absolute threshold). Rather, in the following, two different embodiments for determining the cell quality will be explained in further detail.

Referring Now to the Specialties of the First Embodiment:

In the first embodiment, the mobile terminal 110 determines the cell quality as a sum of two values, namely as the first value, the measured signal quality of the best beam (e.g., of the beam with the best signal quality), plus, as the second value, a combined beam quality value for the other of the plurality of beams (e.g., except the best beam). In other words, the cell quality is based on one measured value, e.g., the measured signal quality of the beam with the best signal quality, and a combined value, e.g., combining measured values from all other (or a subset) of the beams of the same cell.

The determination of the cell quality from the first embodiment can be summarized in the following formula, where the determined cell quality corresponds to: $Q_{meas,cell}$, the measured signal quality of the best beam corresponds to: $Q_{meas,best\_beam}$, and wherein the combined beam quality: $Q_{comb,other\_beams}$:

$$Q_{meas,cell} = Q_{meas,best\_beam} + \frac{1}{A_{mobility\_state}} \cdot Q_{comb,other\_beams}.$$

In this formula, the combined beam quality value for the other beams (except the best beam) is scaled with a scaling factor, where the scaling factor corresponds to:

$$\frac{1}{A_{mobility\_state}}.$$

Importantly, the scaling factor changes depending on the mobility state of the mobile terminal 110. The scaling factor changes such that the combined beam quality value is scaled-up in the high-mobility state and the combined beam quality value is scaled-down in the normal mobility state. This corresponds to:

$$\frac{1}{A_{high\_mobility\_state}} > \frac{1}{A_{normal\_mobility\_state}}, \text{ or}$$

$$A_{normal\_mobility\_state} > A_{high\_mobility\_state}.$$

Advantageously, due to the changing scaling factor, the effect of the combined beam quality value is varied. Thereby, it can better match a situation (e.g., high-mobility state) where it is advantageous, for the combine beam quality value, to reflect the measured signal qualities from all of the beams of the cells, without the losing the possibility to also match another situation (e.g., normal-mobility state).

As already explained above, in an exemplary implementation, the mobile terminal can also be configure to be in one of three mobility states, namely in one of a normal-, high-, or an (intermediate) medium-mobility state. Then, the scaling factor changes such that the combined beam quality value is scaled-up in the high-mobility state compared to in the medium-mobility state and the combined beam quality value is scaled-down in the normal mobility state compared to in the medium-mobility state. In other words, this corresponds to:

$$\frac{1}{A_{high\_mobility\_state}} > \frac{1}{A_{medium\_mobility\_state}} > \frac{1}{A_{normal\_mobility\_state}}, \text{ or}$$

$$A_{normal\_mobility\_state} > A_{medium\_mobility\_state} > A_{high\_mobility\_state}.$$

In a further, more particular exemplary implementation, the scaling factor $$\frac{1}{A_{mobility_{state}}}$$

for the normal-mobility state would be set such that it corresponds to zero (0), and accordingly, the effect of the combined beam quality value also becomes zero (0). This corresponds to:

$$\frac{1}{A_{normal\_mobility\_state}} = 0, \text{ or } A_{normal\_mobility\_state} = \infty.$$

Advantageously, due to the changing scaling factor, the effect of the combined beam quality value is variable therewith, so that it can better match a situation (e.g., normal-mobility state) where it is advantageous, for the combined beam quality value, to reflect the measured signal quality from only the best quality beam(s) of the cells.

In another, more particular exemplary implementation, the combined beam quality value is scaled-up, in the high-mobility state, such that it assumes a value having a same order of magnitude as the measured signal quality of the beam with the best signal quality. This corresponds to:

$$Q_{meas,best\_beam} \approx \frac{1}{A_{mobility\_state}} \cdot Q_{comb,other\_beams}.$$

Advantageously, due to a up-scaling to same order of magnitude for the values, it can be ensured that in the high-mobility state, those cells with a high number of beams are not penalized, but instead have a determined cell quality which is higher than that of cell with only a single beam (as discussed with respect to FIGS. 3 and 4).

Coming back to the description of this first embodiment, it can be appreciated that the mobile terminal is configured with the different scaling factors through the network. For example, in the 3GPP NR deployment scenario, the different scaling factors are provided via a system information broadcast, SIB, message, for example via the SIB3 message which is prescribed to be read in the RRC_IDLE and RRC_INACTIVE state.

Importantly, in the first embodiment the combined beam quality value is one of an (arithmetic) sum, an (arithmetic) average, an (arithmetic) mean, and an (arithmetic) median of the measured signal qualities of the other beams of a cell, excluding the beam with the best signal quality (e.g., i≠best_beam). Assuming for the sake of argument that there are in total 0 . . . k beams detected in a cell, and that one of these beams is the best beam, then the (arithmetic) sum of the other beams of the cell corresponds to:

$$Q_{comb,other\_beams} = \Sigma_{i=0,i\neq best\_beam}^{k} Q_{meas,beam\_i}.$$

It goes without saying that depending on how the combined beam quality value is defined (e.g. sum/average/mean/median), the scaling factors $$\frac{1}{A_{mobility\_state}}$$

have to be adapted accordingly. Otherwise, the advantages resulting from the varying effect of the combined beam quality value cannot be achieved.

In a further exemplary implementation, the combined beam quality value can be further adapted to only reflect a subset of 0 . . . $N_m$ beams from the total 0 . . . k beams detected in a cell, were the subset corresponds to the beams other than the best beams (e.g., i≠best_beam), and where from these other beams, the subset (still) reflects beams with the best signal quality. In other words, the combined beam quality value reflects the beams which have a measured signal quality inferior to the best beam, but still have a higher signal quality than those beams which are not reflected in the subset.

Assuming, the combined beam quality value reflects the subset of beams in form of an (arithmetic) sum, this corresponds to.

$$Q_{comb,other\_beams} = \Sigma_{i=0,i\neq best\_beam}^{N_m<k} Q_{meas,beam\_i}.$$

Equally, the combined beam quality value in this exemplary implementation can be, instead of an (arithmetic) sum, one of an (arithmetic) average, an (arithmetic) mean, and an (arithmetic) median of the measured signal qualities of the other beams of a cell.

Preferably, in this exemplary implementation, the number of beams forming the subset of 0 . . . $N_m$ beams is determined by the mobile terminal depending on the mobility state, resulting in subsets 0 . . . $N_{high\_mobiliy\_state}$ and 0 . . . $N_{normal\_mobiliy\_state}$ or even 0 . . . $N_{medium\_mobiliy\_state}$ of beams to be reflected by the combined bean quality value.

More preferably, the number of beams forming the subset in the high-mobility state (e.g., $N_{high\_mobiliy\_state}$) is set to be larger than the number of beams forming the subset in the normal-mobility state (e.g., $N_{normal\_mobiliy\_state}$), or even the number of beams forming the subset in the high-mobility state (e.g., $N_{high\_mobiliy\_state}$) is set to be larger than the number of beams forming the subset in the medium-mobility state $N_{medium\_mobiliy\_state}$), is larger than the number of beams forming the subset in the normal-mobility state (e.g., $N_{normal\_mobiliy\_state}$). This corresponds to:

$$N_{high\_mobiliy\_state} > N_{medium\_mobiliy\_state} > N_{normal\_mobiliy\_state}).$$

Finally, in an even further exemplary implementation, the combined beam quality value is set to correspond to an integer (e.g., k) indicating the number of the other of the plurality of beams, excluding the beam with the best signal quality, of the in total 0 . . . k beams detected in a cell.

$$Q_{comb,other\_beams} = k-1.$$

Referring Now to the Specialties of the Second Embodiment:

In the second embodiment, the mobile terminal 110 determines the cell quality as a combined beam quality value for a maximum number of 0 . . . $N_m$ beams out of a plurality beams. The beams corresponding to the maximum number of beams are beams with the best signal qualities. In other words, further beams (e.g., k–$N_m$ beams) out of the plurality of 0 . . . k beams, e.g., beams exceeding the maximum number of 0 . . . $N_m$ beams, are resultantly beams with the inferior signal qualities.

The determination of the cell quality from the second embodiment can be summarized in the following formula, where the determined cell quality corresponds to: $Q_{meas,cell}$, and wherein the combined beam quality value of the maximum number of beams: $Q_{comb,max\_beams}$:

$$Q_{meas,cell} = Q_{meas,max\_beams}.$$

Assuming for the sake of argument that the combined beam quality value corresponds to the (arithmetic) average of the measured signal qualities of the maximum number of beams. Then, the combined beam quality value can be calculated as follows:

$$Q_{comb,max\_beams} = \frac{1}{N_m} \Sigma_{i=0}^{N_m<k} Q_{meas,beam\_i}.$$

Alternatively, the combined beam quality value may also be calculated as one of an (arithmetic) mean or an (arithmetic) median of the measured signal qualities of the maximum number of beams.

Importantly, the maximum number of beams $N_m$ for the combined beam quality value changes depending on the mobility state such that the maximum number $N_{high\_mobility\_state}$ is larger in the high-mobility state and the maximum number $N_{normal\_mobility\_state}$ is smaller in the normal-mobility state. This corresponds to:

$$N_{high\_mobility\_state} > N_{normal\_mobility\_state}.$$

Advantageously, due to the changing maximum number of beams, the effect of the combined beam quality value is varied. Thereby, it can better match a situation (e.g., high-mobility state) where it is advantageous, for the combine beam quality value, to reflect the measured signal qualities from all of the beams of the cells, without losing the possibility to also match another situation (e.g., normal-mobility state).

As already explained above, in an exemplary implementation, the mobile terminal can also be configure to be in one of three mobility states, namely in one of a normal-, high-, or an (intermediate) medium-mobility state. Then, the maximum number of beams $N_m$ for the combined beam quality value changes depending on the mobility state such that the maximum number $N_{high\_mobility\_state}$ is larger in the high-mobility state than the maximum number $N_{medium\_mobility\_state}$ in the medium mobility state, and the maximum number $N_{normal\_mobility\_state}$ is smaller in the normal-mobility state than the maximum number $N_{medium\_mobility\_state}$ in the medium mobility state. This corresponds to:

$$N_{high\_mobility\_state} > N_{medium\_mobility\_state} > N_{normal\_mobility\_state}.$$

It shall not go without saying that there are also cases where the total 0 . . . k beams detected in a cell are smaller than the maximum number of beams $N_m$ for the combined beam quality value. This is however not part of the scope of the present disclosure. Then, the combined beam quality value can be calculates as follows:

$$Q_{comb,max\_beams} = \frac{1}{k}\sum_{i=0}^{k<N_m} Q_{meas,beam\_i}.$$

In an exemplary implementation, the maximum number of beams, for which the combined beam quality value is determined, assumes in the normal-mobility state the value of one. This corresponds to:

$$N_{normal\_mobility\_state}=0.$$

In an another exemplary implementation, the maximum number of beams, for which the combined beam quality value is determined, assumes in the high-mobility state the value of five. This corresponds to:

$$N_{high\_mobility\_state}=4.$$

Coming back to the description of this second embodiment, it can be appreciated that the mobile terminal 110 is configured with the different number of beams to be considered through the network. For example, in the 3GPP NR deployment scenario, the different numbers of beams are provided via a system information broadcast, SIB, message, for example via the SIB3 message which is prescribed to be read in the RRC_IDLE and RRC_INACTIVE state.

In a further exemplary embodiment, the combined beam quality value is scaled adjusted with a weighting factor (e.g., w) which changes depending on a difference in the measured signal qualities of at least two of the plurality of beams. Then the combined beam quality value can be calculated as follows:

$$Q_{comb,max\_beams} = w \cdot \frac{1}{N_m}\sum_{i=0}^{N_m<k} Q_{meas,beam\_i}.$$

For example, the weighting factor can be calculated as being inversely proportional to the difference in the measured signal qualities of the best beam (e.g., the beam with the best signal quality) and the second-to-best beam. This computes to:

$$w = C/(Q_{meas,best\_beam} - Q_{meas,second\_to\_best\_beam}).$$

C is an arbitrary constant value. Alternatively, the weighting factor can be calculated as being inversely proportional to the standard deviation in the measured signal qualities of the maximum number of beams. This computes to:

$$w = C/\sqrt{\frac{\sum_{i=0}^{N_m}(Q_{meas,beam_i} - \overline{Q_{meas,beam_i}})^2}{N_m}}.$$

Advantageously, in both examples due to the weighting factor, it can be ensured that for those cells having the beams with similar signal qualities, they can have a better determined cell quality compared to those cells having the beams with varied signal qualities.

Referring now again to the general disclosure of step S02 in FIG. 2, which is not only related to the first or second embodiments, it shall (again) be noted that the cell quality can only be determined for beams which are (actually) detected by the mobile terminal. In the context of the present disclosure, the term detected beams shall define only those beams having a measured signal quality value above an absolute threshold value.

For example in the 3GPP NR deployment scenario, this absolute threshold value can be set to a specified (predefined) value, or can be configured via a system information broadcast, SIB, message, for example via the SIB3 message which is prescribed to be read in the RRC_IDLE and RRC_INACTIVE state.

Also, in the 3GPP NR deployment scenario, the cell quality is determined based on the signal qualities of each of the plurality of beams which have been measured for at least a configured time duration ($T_{reselection}$).

Finally, in step S03 of FIG. 2, the mobile terminal selects or reselects that cell from the at least two suitable cells for camping thereon based on a cell selection or reselection criterion using the determined cell qualities. This is however not at the focus of the present disclosure. Exemplarily, the cell selection or reselection criterion can be specified to result in the selection of the cell with the highest cell quality from the determined cell qualities for Cell A and Cell B. In any case, the sell selection or reselection results in the mobile camping on one of the cells (Cell B in FIG. 2).

Cell Selection Criteria

In spite of the fact that the definition of cell selection criteria is not at the focus of the present disclosure, the following disclosure gives an example of a cell selection criterion as presently specified in 3GPP TSG RAN TS 36.304 v14.5.0: "*User Equipment (UE) procedures in idle mode*" December 2017. In this exemplary implementation from E-UTRAN, a mobile terminal equally uses the determined cell quality $Q_{meas,cell}$ in the cell selection criteria to decide whether a cell is a suitable cell which the mobile terminal can camp on. The criterion is defined as follows:

Srxlev>0 AND Squal>0, where

Srxlev=$Q_{rxlevmeas}-(Q_{rxlevmin}+Q_{rxlevminoffset})-P$compensation$-Q$offset$_{temp}$ $$\text{Squal}=Q_{qualmeas}-(Q_{qualmin}+Q_{qualminoffset})-Q\text{Off-Set}_{temp}.$$

Srxlev is the cell selection RX level value (dB), Squal is the cell selection quality value (dB), Qoffset$_{temp}$ is the offset temporarily applied to a cell (in dB), $Q_{rxlevmeas}$ is the measured cell RX level value (RSRP), $Q_{qualmeas}$ is the measured cell quality value (RSRQ), $Q_{rxlevmin}$ is the minimum required RX level in the cell (dBm), $Q_{qualmin}$ is the minimum required quality level in the cell (dB), $Q_{rxlevminoffset}$ is the offset to the signaled $Q_{rxlevmin}$ taken into account in the Srxlev evaluation as a result of a periodic search for a higher priority PLMN while camped normally in a VPLMN, and $Q_{qualminoffset}$ is the offset to the signaled $Q_{qualmin}$ taken into account in the Squal evaluation as a result of a periodic search for a higher priority PLMN while camped normally in a VPLMN.

The signaled values $Q_{rxlevminoffset}$ and $Q_{qualminoffset}$ are only applied when a cell is evaluated for cell selection as a result of a periodic search for a higher priority PLMN while camped normally in a VPLMN. During this periodic search for higher priority PLMN the UE may check the S criteria of a cell using parameter values stored from a different cell of this higher priority PLMN.

If cell selection criterion S in normal coverage is not fulfilled for a cell, UE shall consider itself to be in enhanced coverage if the cell selection criterion S for enhanced coverage is fulfilled, where $Q_{rxlevmin}$ is the coverage specific value $Q_{rxlevmin\_CE}$ (dBm) and $Q_{qualmin}$ is the coverage specific value $Q_{qualmin\_CE}$ (dB).

If cell selection criterion S in normal coverage is not fulfilled for a cell and UE does not consider itself in enhanced coverage based on coverage specific values $Q_{rxlevmin\_CE}$ and $Q_{qualmin\_CE}$, UE shall consider itself to be in enhanced coverage if UE supports CE Mode B and the cell selection criterion S for enhanced coverage is fulfilled, where $Q_{rxlevmin}$ is the coverage specific value $Q_{rxlevmin}\_CE1$ (dBm) and $Q_{qualmin}$ is the coverage specific value $Q_{qualmin\_CE1}$ (dB).

For the UE in enhanced coverage, coverage specific values $Q_{rxlevmin\_CE}$ and $Q_{qualmin\_CE}$ (or $Q_{rxlevmin\_CE1}$ and $Q_{qualmin\_CE1}$) are only applied for the suitability check in enhanced coverage (e.g., not used for measurement and reselection thresholds).

Cell Reselection Criteria

In spite of the fact that the definition of cell reselection criteria is not at the focus of the present invention, the following disclosure gives an example of cell reselection criteria as presently specified in 3GPP TSG RAN TS 36.304 v14.5.0: "*User Equipment (UE) procedures in idle mode*" December 2017. In this exemplary implementation from E-UTRAN, (again) a mobile terminal equally uses the determined cell quality $Q_{meas,cell}$ in the cell reselection criteria to decide whether a cell is a suitable cell which the mobile terminal can camp on. The criteria are defined as follows:

$$R_s = Q_{meas,s} + Q_{Hyst} - Q_{offsettemp}$$

$$R_n = Q_{meas,n} + Q_{offset} - Q_{offsettemp}, \text{ where}$$

$Q_{meas,s}$ is the measured serving cell quality in RSRP, the measured $Q_{meas,n}$ is the measured neighboring cell quality in RSRP, $Q_{Hyst}$ is the hysteresis value applied to the serving cell, $Q_{offset}$ is the offset (sum of the frequency offset and cell offset) applied to the evaluated neighboring cell, $Q_{offsettemp}$ is the offset used score down the R value in case the RRC connection establishment procedure has failed several times for that cell.

The cells shall be ranked according to the R criteria specified above, deriving $Q_{meas,n}$ and $Q_{meas,s}$ and calculating the R values using averaged RSRP results. If a cell is ranked as the best cell the UE shall perform cell reselection to that cell. In all cases, the UE shall reselect the new cell, only if the following conditions are met: 1) the new cell is better ranked than the serving cell during a time interval $T_{reselectionRAT}$; 2) more than 1 second has elapsed since the UE camped on the current serving cell.

For the case where the neighboring cell has higher priority than the serving cell, UE will reselect the neighboring cell if $Q_{meas,n}$ is larger than a threshold, $\text{Thres}_{RAT,HighP}$, for a continuous time interval $T_{reselectionRAT}$. For the case where the serving cell has higher priority than the neighboring cell, UE will reselect the neighboring cell if $Q_{meas,s}$ is less than a threshold, $\text{Thres}_{Serving,LowP}$, and $Q_{meas,n}$ is larger than another threshold, $\text{Thres}_{RAT,LowP}$, for a continuous time interval $T_{reselectionRAT}$.

Mobility States

In an exemplary implementation, the mobility state of a mobile terminal may be determined as follows, readily applying the concepts already established in E-UTRAN to a deployment scenario of 3GPP NR. For this purpose of identifying a normal-mobility state as well as a high-mobility and a medium-mobility state in an embodiment, the parameters (TCRmax, NCR_H, NCR_M and TCRmaxHyst) are sent in the system information broadcast of the cell serving the mobile terminal.

Further, state detection criteria are defined as follows:

The mobile terminal is configured to be in a medium-mobility state if a number of cell reselections during time period TCRmax exceeds NCR_M and not exceeds NCR_H. Similarly, the mobile terminal is configured to be in the high-mobility state if number of cell reselections during time period TCRmax exceeds NCR_H. In any case, the mobile terminal shall not count consecutive reselections between same two cells into mobility state detection criteria if same cell is reselected just after one other reselection. If none of the conditions for either Medium- or High-mobility state is met during time period TCRmaxHyst, then the mobile terminal is configured to the Normal-mobility state.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a mobile terminal is suggested for performing cell (re-)selection in a wireless communication system. The system comprises at least two suitable cells for the mobile terminal to camp on. Each cell is configured with a plurality of beams. Further, the mobile terminal is configured in one of at least a normal- or a high-mobility state. The mobile terminal comprises circuitry which in operation: measures a signal quality of the plurality of beams of each of the at least two suitable cells; determines the cell quality for each of the at least two suitable cells based on the respective measured signal qualities of the plurality of beams; and (re-)selects that cell from the at least two suitable cells for camping thereon based on a cell (re-)selection criterion using the determined cell qualities. The cell quality is determined for each one of the at least two suitable cells as a sum of the measured signal quality of the beam, with the best signal quality, and a combined beam quality value for the other of the plurality of beams, and the combined beam quality value is scaled with a scaling factor which changes depending on the mobility state such that the combined beam quality value is scaled-up in the high-mobility state and scaled-down in the normal-mobility state.

According to a second aspect, which can be combined with the first aspect, in the normal-mobility state, the combined beam quality value is scaled-down such that it assumes the value of zero.

According to a third aspect, which can be combined with the first or second aspect, in the high-mobility state, the combined beam quality value is scaled-up such that it assumes a value having a same order of magnitude as the measured signal quality of the beam with the best signal quality.

According to a fourth aspect, which can be combined with the first to third aspect, the mobile terminal is configured with at least two different scaling factors which are used for scaling the combined beam quality value in the normal- and in the high-mobility state, respectively.

According to a fifth aspect, which can be combined with the first to fourth aspect, the combined beam quality value corresponds to a sum/average/mean/median of the measured signal quality of the other of the plurality of beams, excluding the beam with the best signal quality, of the at least two suitable cells.

According to a sixth aspect, which can be combined with the first to fourth aspect, the combined beam quality value corresponds to a sum/average/mean/median of the measured signal quality of a subset of the other of the plurality of beams, excluding the beam with the best signal quality, of the at least two suitable cells, and wherein the number of beams forming the subset changes depending on the mobility state, and preferably, wherein the number of beams forming the subset is set by the mobile terminal depending on the mobility state, and more preferably, wherein the number of beams forming the subset in the high-mobility state is set to be larger than the number of beams forming the subset in the normal-mobility state.

According to a seventh aspect, which can be combined with the first to fourth aspect, the combined beam quality value corresponds to a integer indicating the number of the other of the plurality of beams, excluding the beam with the best signal quality, of the at least two suitable cells.

According to an eighth aspect, another mobile terminal is proposed for performing cell (re-)selection in a wireless communication system. The system comprises at least two suitable cells for the mobile terminal to camp on. Each of the cells is configured with a plurality of beams. Further, the mobile terminal is configured in one of at least a normal- or a high-mobility state. The mobile terminal comprises circuitry which in operation: measures a signal quality of the plurality of beams of each of the at least two suitable cells; determines the cell quality for each of the at least two suitable cells based on the respective measured signal quality of the plurality of beams; and (re-)selects that cell from the at least two suitable cells for camping thereon based on a cell (re-)selection criterion using the determined cell qualities. The cell quality is determined for each one of the at least two suitable cells as a combined beam quality value for a maximum number of beams, with the best signal qualities, out of the plurality of beams, and the maximum number of beams for the combined beam quality value changes depending on the mobility state such that the maximum number is larger in the high-mobility state and the maximum number is smaller in the normal-mobility state.

According to a ninth aspect, which can be combined with the eighth aspect, in the normal-mobility state, the combined beam quality value is scaled-down such that it assumes the value of zero.

According to a tenth aspect, which can be combined with the eighth or ninth aspect, in the high-mobility state, the combined beam quality value is scaled-up such that it assumes a value having a same order of magnitude as the measured signal quality of the beam with the best signal quality.

According to an eleventh aspect, which can be combined with the eighth to tenth aspect, the mobile terminal is configured with at least two different scaling factors which are used for scaling the combined beam quality value in the normal- and in the high-mobility state, respectively.

According to a twelfth aspect, which can be combined with the first to eleventh aspect, the combined beam quality value corresponds to an average/mean/median of the measured signal quality of the maximum number of beams of the at least two suitable cells, and preferably wherein the combined beam quality value is adjusted with a weighting factor which changes depending on a difference in measured signal qualities of at least two of the plurality of beams.

According to a thirteenth aspect, which can be combined with the first to twelfth aspect, all of the beams of the plurality of beams of each of the at least two suitable cells have a measured signal quality above a configured absolute threshold value.

According to a fourteenth aspect, which can be combined with the first to thirteenth aspect, the signal quality of each of the plurality of beams is measured in form of a reference signal received power, RSRP, or a reference signal received quality, RSRQ.

According to a fifteenth aspect, which can be combined with the first to fourteenth aspect, the cell quality is determined based on the signal qualities of each of the plurality of beams which have been measured for at least a configured time duration (Treselection).

According to a sixteenth aspect, which can be combined with the first to fifteenth aspect, for each of the at least two suitable cells, the plurality of beams are additionally ranked using the measured signal qualities to determine the beam(s) with the best signal quality(ies).

According to a seventeenth aspect, which can be combined with the eighth aspect, the mobile terminal is configured to perform the cell (re-)selection when it is configured in a Radio Resource Control, RRC_IDLE or an RRC_INACTIVE state.

According to an eighteenth aspect, a method is proposed for a mobile terminal to perform cell (re-)selection in a wireless communication system. The system comprises at least two suitable cells for the mobile terminal to camp on. Each of the cells is configured with a plurality of beams. Further, the mobile terminal is configured in one of at least a normal- or a high-mobility state. The method comprising the following steps performed by the mobile terminal: measuring a signal quality of the plurality of beams of each of the at least two suitable cells; determining the cell quality for each of the at least two suitable cells based on the respective measured signal qualities of the plurality of beams; and (re-)selecting that cell from the at least two suitable cells for camping thereon based on a cell (re-)selection criterion using the determined cell qualities. The cell quality is determined for each one of the at least two suitable cells as a sum of the measured signal quality of the beam, with the best signal quality, and a combined beam quality value for the other of the plurality of beams, and the combined beam quality value is scaled with a scaling factor which changes depending on the mobility state such that the combined beam quality value is scaled-up in the high-mobility state and scaled-down in the normal-mobility state.

According to a nineteenth aspect, which can be combined with the eighteenth aspect, in the normal-mobility state, the combined beam quality value is scaled-down such that it assumes the value of zero.

According to a twentieth aspect, which can be combined with the eighteenth or nineteenth aspect, in the high-mobility state, the combined beam quality value is scaled-up such that it assumes a value having a same order of magnitude as the measured signal quality of the beam with the best signal quality.

According to a twenty-first aspect, which can be combined with the eighteenth to twentieth aspect, the mobile terminal further performs the step of being configured with at least two different scaling factors which are used for scaling the combined beam quality value in the normal- and in the high-mobility state, respectively.

According to a twenty-second aspect, which can be combined with the eighteenth to twenty-first aspect, the combined beam quality value corresponds to a sum/average/mean/median of the measured signal quality of the other of the plurality of beams, excluding the beam with the best signal quality, of the at least two suitable cells.

According to a twenty-third aspect, which can be combined with the eighteenth to twenty-first aspect, the combined beam quality value corresponds to a sum/average/mean/median of the measured signal quality of a subset of the other of the plurality of beams, excluding the beam with the best signal quality, of the at least two suitable cells, and wherein the number of beams forming the subset changes depending on the mobility state, and preferably, wherein the number of beams forming the subset is set by the mobile terminal depending on the mobility state, and more preferably, wherein the number of beams forming the subset in the high-mobility state is set to be larger than the number of beams forming the subset in the normal-mobility state.

According to a twenty-fourth aspect, which can be combined with the eighteenth to twenty-first aspect, the combined beam quality value corresponds to an integer indicating the number of the other of the plurality of beams, excluding the beam with the best signal quality, of the at least two suitable cells.

According to a twenty-fifth aspect, another method is suggested for a mobile terminal to perform cell (re-)selection in a wireless communication system. The system comprises at least two suitable cells for the mobile terminal to camp on. Each cell is configured with a plurality of beams. Further, the mobile terminal is configured in one of at least a normal- or a high-mobility state. The method comprises the following steps performed by the mobile terminal: measuring a signal quality of the plurality of beams of each of the at least two suitable cells; determining the cell quality for each of the at least two suitable cells based on the respective measured signal qualities of the plurality of beams; and (re-)selecting that cell from the at least two suitable cells for camping thereon based on a cell (re-)selection criterion using the determined cell qualities. The cell quality is determined for each one of the at least two suitable cells as a combined beam quality value for a maximum number of beams, with the best signal qualities, out of the plurality of beams, and the maximum number of beams for the combined beam quality value changes depending on the mobility state such that the maximum number is larger in the high-mobility state and the maximum number is smaller in the normal-mobility state.

According to a twenty-sixth aspect, which can be combined with the twenty-fifth aspect, in the normal-mobility state, the maximum number of beams, for which the combined beam quality value is determined, assumes the value of one.

According to a twenty-seventh aspect, which can be combined with the twenty-fifth or twenty-sixth aspect, in the high-mobility state, the maximum number of beams, for which the combined beam quality value is determined, assumes the value of five.

According to a twenty-eighth aspect, which can be combined with the twenty-fifth to twenty-seventh aspect, the mobile terminal is configured with at least two different values which are used as maximum number of beams in the normal- and in the high-mobility state, respectively.

According to a twenty-ninth aspect, which can be combined with the twenty-fifth to twenty-eighth aspect, the combined beam quality value corresponds to an average/mean/median of the measured signal quality of the maximum number of beams of the at least two suitable cells, and preferably wherein the combined beam quality value is adjusted with a weighting factor which changes depending on a difference in measured signal qualities of at least two of the plurality of beams.

According to a thirtieth aspect, which can be combined with the eighteenth to twenty-ninth aspect, all of the beams of the plurality of beams of each of the at least two suitable cells have a measured signal quality above a configured absolute threshold value.

According to a thirty-first aspect, which can be combined with the eighteenth to thirtieth aspect, the combined beam quality value corresponds to: the signal quality of each of the plurality of beams is measured in form of a reference signal received power, RSRP, or a reference signal received quality, RSRQ.

According to a thirty-second aspect, which can be combined with the eighteenth to thirty-first aspect, wherein the cell quality is determined based on the signal qualities of each of the plurality of beams which have been measured for at least a configured time duration (Treselection).

According to a thirty-third aspect, which can be combined with the eighteenth to thirty-second aspect, for each of the at least two suitable cells, the plurality of beams are additionally ranked using the measured signal qualities to determine the beam(s) with the best signal quality(ies).

According to a thirty-fourth aspect, which can be combined with the eighteenth to thirty-third aspect, the mobile terminal performs the cell (re-)selection when it is configured in a Radio Resource Control, RRC_IDLE or an RRC_INACTIVE state.

The invention claimed is:

1. A mobile terminal, comprising:
a transceiver which, in operation, measures a signal quality of a plurality of beams of each of at least two cells;
circuitry which, in operation, is configured in one of at least a normal- or a high-mobility state, and
determines a cell quality for each of the at least two cells based on the respective measured signal qualities of the plurality of beams; and
(re-)selects a cell from the at least two cells for camping thereon based on a cell (re-) selection criterion using the determined cell qualities;
wherein the cell quality is determined for each one of the at least two cells as a sum of the measured signal quality of the beam, with the best signal quality, and a combined beam quality value for the other of the plurality of beams, excluding the beam with the best signal quality, and
wherein the combined beam quality value is scaled with a scaling factor which changes depending on the mobility state such that the combined beam quality value is scaled-up in the high-mobility state and scaled-down in the normal-mobility state.

2. The mobile terminal according to claim 1, wherein:
in the normal-mobility state, the combined beam quality value is scaled-down such that it assumes the value of zero; and/or
in the high-mobility state, the combined beam quality value is scaled-up such that it assumes a value having a same order of magnitude as the measured signal quality of the beam with the best signal quality; and/or
the mobile terminal is configured with at least two different scaling factors which are used for scaling the combined beam quality value in the normal- and in the high-mobility state, respectively.

3. The mobile terminal according to claim 1, wherein combined beam quality value corresponds to:
a sum/average/mean/median of the measured signal quality of the other of the plurality of beams of the at least two cells; or
a sum/average/mean/median of the measured signal quality of a subset of the other of the plurality of beams of the at least two cells, and wherein the number of beams forming the subset changes depending on the mobility state, and preferably, wherein the number of beams forming the subset is set by the mobile terminal depending on the mobility state, and more preferably, wherein the number of beams forming the subset in the high-mobility state is set to be larger than the number of beams forming the subset in the normal-mobility state; or
an integer indicating the number of the other of the plurality of beams of the at least two cells.

4. The mobile terminal according to claim 1, wherein all of the beams of the plurality of beams of each of the at least two cells have a measured signal quality above a configured absolute threshold value; and/or
wherein the signal quality of each of the plurality of beams is measured in form of a reference signal received power, RSRP, or a reference signal received quality, RSRQ; and/or
wherein the cell quality is determined based on the signal qualities of each of the plurality of beams which have been measured for at least a configured time duration; and/or
wherein, for each of the at least two cells, the plurality of beams are additionally ranked using the measured signal qualities to determine the beam(s) with the best signal quality(ies); and or
wherein the mobile terminal is configured to perform the cell (re-)selection when it is configured in a Radio Resource Control, RRC_IDLE or an RRC_INACTIVE state.

5. A mobile terminal, comprising:
a transceiver which, in operation detects a plurality of beams of at least two cells and measures a signal quality of the detected plurality of beams; and
circuitry which, in operation, is configured in one of at least a normal- or a high-mobility state, and
determines a cell quality for each of the at least two cells using a combined beam quality value for a maximum number of beams, out of the detected plurality of beams; and
(re-)selects that cell from the at least two cells for camping thereon based on a cell (re-) selection criterion using the determined cell qualities;
wherein the combined beam quality value is calculated based on the respective measured signal qualities of the maximum number of beams with the best signal qualities, and
wherein the maximum number of beams for the combined beam quality value changes depending on the mobility state such that the maximum number is larger in the high-mobility state and the maximum number is smaller in the normal-mobility state, and
wherein the mobile terminal is configured with at least two different values which are used as maximum number of beams in the normal- and in the high-mobility state, respectively.

6. The mobile terminal according to claim 5, wherein:
in the normal-mobility state, the maximum number of beams, for which the combined beam quality value is determined, assumes the value of one; and/or
in the high-mobility state, the maximum number of beams, for which the combined beam quality value is determined, assumes the value of five.

7. The mobile terminal according to claim 5, wherein the combined beam quality value corresponds to:
an average/mean/median of the measured signal quality of the maximum number of beams of the at least two cells, and preferably wherein the combined beam quality value is adjusted with a weighting factor which changes depending on a difference in measured signal qualities of at least two of the plurality of beams.

8. A method for a mobile terminal to perform cell (re-)selection the mobile terminal comprising circuitry configured in one of at least a normal- or a high-mobility state, the method comprising the following steps of,
measuring a signal quality of a plurality of beams of each of at least two cells;
determining a cell quality for each of the at least two cells based on the respective measured signal qualities of the plurality of beams; and
(re-)selecting a cell from the at least two cells for camping thereon based on a cell (re-) selection criterion using the determined cell qualities;
wherein the cell quality is determined for each one of the at least two cells as a sum of the measured signal quality of the beam, with the best signal quality, and a combined beam quality value for the other of the plurality of beams, excluding the beam with the best signal quality, and wherein the combined beam quality value is scaled with a scaling factor which changes depending on the mobility state such that the combined beam quality value is scaled-up in the high-mobility state and scaled-down in the normal-mobility state.

9. The method according to claim 8, wherein:

in the normal-mobility state, the combined beam quality value is scaled-down such that it assumes the value of zero; and/or in the high-mobility state, the combined beam quality value is scaled-up such that it assumes a value having a same order of magnitude as the measured signal quality of the beam with the best signal quality; and/or the mobile terminal further performs the step of being configured with at least two different scaling factors which are used for scaling the combined beam quality value in the normal- and in the high-mobility state, respectively.

10. The method according to claim 8, wherein the combined beam quality value corresponds to:

a sum/average/mean/median of the measured signal quality of the other of the plurality of beams of the at least two cells; or a sum/average/mean/median of the measured signal quality of a subset of the other of the plurality of beams of the at least two cells, and wherein the number of beams forming the subset changes depending on the mobility state, and preferably, wherein the number of beams forming the subset is set by the mobile terminal depending on the mobility state, and more preferably, wherein the number of beams forming the subset in the high-mobility state is set to be larger than the number of beams forming the subset in the normal-mobility state; or an integer (k) indicating the number of the other of the plurality of beams of the at least two cells.

11. The method according to claim 8, wherein all of the beams of the plurality of beams of each of the at least two cells have a measured signal quality above a configured absolute threshold value; and/or wherein the signal quality of each of the plurality of beams is measured in form of a reference signal received power, RSRP, or a reference signal received quality, RSRQ; and/or wherein the cell quality is determined based on the signal qualities of each of the plurality of beams which have been measured for at least a configured time duration; and/or wherein, for each of the at least two cells, the plurality of beams are additionally ranked using the measured signal qualities to determine the beam(s) with the best signal quality(ies); and/or wherein the mobile terminal performs the cell (re-)selection when it is configured in a Radio Resource Control, RRC_IDLE or an RRC_INACTIVE state.

12. A method for a mobile terminal to perform cell (re-)selection, the mobile terminal comprising circuitry configured in one of at least a normal- or a high-mobility state, the method comprising the following steps of, detecting a plurality of beams of at least two cells;

measuring a signal quality of the detected plurality of beams;

determining a cell quality for each of the at least two cells using a combined beam quality value for a maximum number of beams, out of the detected plurality of beams; and (re-)selecting a cell from the at least two cells for camping thereon based on a cell (re-)selection criterion using the determined cell qualities;

wherein the combined beam quality value is calculated based on the respective measured signal qualities of the maximum number of beams with the best signal qualities, and wherein the maximum number of beams for the combined beam quality value changes depending on the mobility state such that the maximum number is larger in the high-mobility state and the maximum number is smaller in the normal-mobility state, and wherein the mobile terminal further performs the step of being configured with at least two different values which are used as maximum number of beams in the normal- and in the high-mobility state, respectively.

13. The method according to claim 12, wherein:

in the normal-mobility state, the maximum number of beams, for which the combined beam quality value is determined, assumes the value of one; and/or in the high-mobility state, the maximum number of beams, for which the combined beam quality value is determined, assumes the value of five.

14. The method according to claim 12, wherein the combined beam quality value corresponds to:

an average/mean/median of the measured signal quality of the maximum number of beams of the at least two cells, and preferably wherein the combined beam quality value is adjusted with a weighting factor which changes depending on a difference in measured signal qualities of at least two of the plurality of beams.

* * * * *